Figure 1:
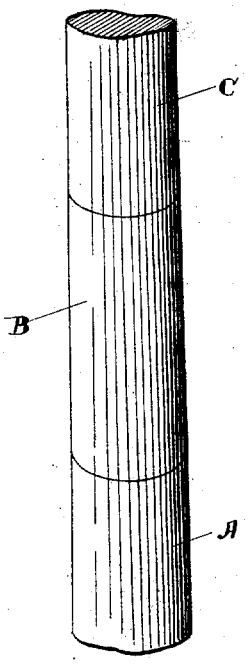

F. LATULIP.

FERRULE.

No. 11,357. Reissued Aug. 8, 1893.

Witnesses:

W. Johnson.

James E. Jester.

Inventor:

Frederick Latulip

By J. R. Nottingham Atty

UNITED STATES PATENT OFFICE.

FREDERICK LATULIP, OF SYRACUSE, NEW YORK, ASSIGNOR TO THE SYRACUSE SPECIALTY MANUFACTURING COMPANY, OF NEW YORK.

FERRULE.

SPECIFICATION forming part of Reissued Letters Patent No. 11,357, dated August 8, 1893.

Original No. 467,979, dated February 2, 1892. Application for reissue filed June 17, 1893. Serial No. 478,019.

*To all whom it may concern:*

Be it known that I, FREDERICK LATULIP, a citizen of the United States, residing at Syracuse, in the county of Onondaga and State of New York, have invented certain new and useful Improvements in Ferrules, of which the following is a full, clear, and exact specification.

My present invention more especially relates to the manufacture of rawhide ferrules adapted for uniting articles composed of sections or joints, such as fishing-rods, and for many other analogous purposes.

The object of my invention is to produce a strong, light, slightly-elastic, but durable ferrule adapted readily to be applied to and firmly to grasp the article to which it is applied.

In order to carry out the objects of my invention in the best way now known to me, I take the ordinary dried rawhides of commerce and soak them in water sufficiently to soften the hides and remove the lime therefrom. They are then well fleshed and split into thin layers in well known ways. These layers are then soaked in a bath of liquid ammonia for from ten to fifteen minutes, after which they are thoroughly dried and cut into strips of the width desired. These strips are then beaten or pounded until they become soft and pliable, after which they are subjected to a bath consisting of a solution of sulphuric acid in water, in about the proportion of a half-pint of acid to a gallon of water, for about ten minutes. A bath of pure naphtha might be substituted for the sulphuric-acid one above mentioned with equally good results. The effect of either of these baths is to cause a drawing or exudation of a portion of the gelatine contained in the strip to its surfaces, thus constituting a cement, which causes these surfaces to adhere when wound upon each other.

When in the soft, elastic, and flexible condition caused by the treatment above described the inner end of the strip is clamped or otherwise secured upon a former or mandrel in well known ways and wound tightly thereon in spiral overlapping layers, the cement pressure and strain causing the layers firmly to adhere. It may be advisable in some instances to apply additional cement to the surfaces before uniting them, as in cases where the strips have become dried before being used. The ferrule is then dried, which causes it to become hard and to shrink tightly upon the former or mandrel on which it is wrapped. It may then be turned, smoothed, or formed into the shape desired and varnished or coated with water-proof material on either or both surfaces.

Figure 3:
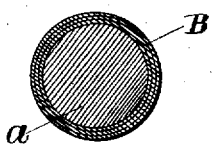
Figure 2:
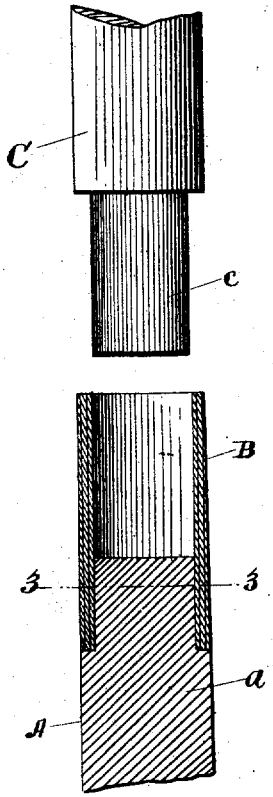

In the accompanying drawings, which show my invention as adapted for connecting the joints of fishing or other rods, Figure 1 is a view in perspective of portions of the rod and the ferrule uniting them; Fig. 2, a view, partly in elevation and partly in longitudinal section, of the same parts with the joints separated; Fig. 3, a cross-section through the joint and ferrule on the line 3 3 of Fig. 2.

The abutting sections or joints are turned down on their ends, so that when inserted in the ferrule its exterior forms a flush or smooth joint.

Fig. 2, shows the ferrule B as secured upon the reduced end *a* of the section A, with a portion of the ferrule projecting therefrom sufficient for the insertion of the corresponding end *c* of the section C, as in an ordinary fishing-rod.

My patent of November 13, 1888, No. 392,957, shows a rawhide cap or cup stamped from a single thickness of material covering the end of a tool. It is also old to clamp a series of disks of rawhide arranged edgewise side by side upon a tool or handle.

My invention obviously differs in construction and operation from both the above devices.

Cemented strips of rawhide have also been wound upon spools to constitute the hammering-face of a mallet; but so far as I am aware I am the first to produce a rawhide ferrule adapted to be wound upon and grasp the ends or abutting sections of articles, so as to afford a strong connection or joint.

I am also aware that it has been proposed to encircle a whip with a molded cemented leather ring for purposes of ornamentation; but such a ring obviously differs materially in its method of manufacture and result from my improved ferrule, which constitutes a new article of manufacture not heretofore known in the art, which, while slightly elastic, is nearly as tough as steel, which will not break or split under any reasonable strain, and which, by its shrinking and drying, tends firmly to grasp the article upon which it is secured without extraneous fastening.

I do not broadly claim winding a cemented strip of rawhide in successive layers; but,

Having thus fully described my improved ferrule and its mode of manufacture, what I claim therein as new, and desire to secure by Letters Patent, is—

1. As a new article of manufacture, a ferrule, composed of rawhide wound flatwise in successive overlapping adhesive layers, and then dried, substantially as set forth.

2. As a new article of manufacture, the hereinbefore described ferrule, composed of rawhide treated substantially as hereinbefore set forth, wound flatwise in successive overlapping adhesive layers, and then dried, hardened, and polished, as set forth, to adapt it for connecting the abutting ends of articles.

3. The combination, substantially as hereinbefore set forth, of the joint or section with the rawhide ferrule composed of successive overlapping adhesive layers shrunk thereon and adapted to receive the abutting end of the adjacent section or joint, as set forth.

4. The combination of the section or joint A, its reduced end or shoulder *a*, the rawhide ferrule composed of successive adhesive overlapping layers wound flatwise upon each other and upon the shoulder and shrunk thereon and the projecting end of the ferrule constituting a socket for the reception of the shoulder *c* of the corresponding joint or section C, as set forth.

In testimony whereof I have hereunto subscribed my name.

FREDERICK $\overset{\text{his}}{\underset{\text{mark}}{\times}}$ LATULIP.

Witnesses:
C. E. FRITCHER,
W. G. LINDSEY.